United States Patent
Huang et al.

(10) Patent No.: US 11,673,579 B1
(45) Date of Patent: Jun. 13, 2023

(54) CONTROLLING A VEHICLE BASED ON DATA PROCESSING FOR A FAULTY TIRE

(71) Applicant: PlusAI, Inc., Cupertino, CA (US)

(72) Inventors: Xiaoyu Huang, San Jose, CA (US); Siva Bhargav Ravella, Santa Clara, CA (US)

(73) Assignee: PlusAI, Inc.

( * ) Notice: Subject to any disclaimer, the term of this patent is extended or adjusted under 35 U.S.C. 154(b) by 0 days.

(21) Appl. No.: 17/708,577

(22) Filed: Mar. 30, 2022

(51) Int. Cl.
| *B60W 60/00* | (2020.01) |
| *B60W 50/14* | (2020.01) |
| *B60W 40/10* | (2012.01) |
| *B60W 40/13* | (2012.01) |
| *G07C 5/08* | (2006.01) |
| *B60W 50/00* | (2006.01) |

(52) U.S. Cl.
CPC .... *B60W 60/0015* (2020.02); *B60W 50/0098* (2013.01); *G07C 5/0816* (2013.01); *B60W 2300/145* (2013.01); *B60W 2420/42* (2013.01); *B60W 2420/54* (2013.01); *B60W 2510/202* (2013.01); *B60W 2520/105* (2013.01); *B60W 2520/14* (2013.01); *B60W 2520/16* (2013.01); *B60W 2520/18* (2013.01); *B60W 2530/10* (2013.01); *B60W 2530/20* (2013.01); *B60W 2554/4041* (2020.02); *B60W 2554/4046* (2020.02); *B60W 2720/10* (2013.01)

(58) Field of Classification Search
CPC ....... B60W 2300/145; B60W 2420/42; B60W 2420/54; B60W 2510/202; B60W 2520/105; B60W 2520/14; B60W 2520/16; B60W 2520/18; B60W 2530/10; B60W 2530/20; B60W 2554/4041; B60W 2554/4046; B60W 2720/10; B60W 50/0098; B60W 60/0015; G07C 5/0816
See application file for complete search history.

(56) References Cited

U.S. PATENT DOCUMENTS

| 2002/0107694 A1* | 8/2002 | Lerg ................... B60C 23/06 704/273 |
| 2006/0111829 A1* | 5/2006 | Williams ............. B60C 23/04 701/91 |
| 2017/0308097 A1* | 10/2017 | Switkes ................ G08G 1/22 |
| 2018/0065622 A1* | 3/2018 | Nishimine ............ B60K 6/445 |
| 2018/0099712 A1* | 4/2018 | Bean ................... G08B 13/08 |
| 2018/0237001 A1* | 8/2018 | Lian ................... B60L 3/0076 |
| 2018/0244281 A1* | 8/2018 | Jankowski ........ B60C 23/00345 |
| 2019/0047500 A1* | 2/2019 | Ghannam ............. B60R 21/013 |
| 2019/0118751 A1* | 4/2019 | Ghannam ......... B60R 21/01336 |

(Continued)

*Primary Examiner* — Peter D Nolan
*Assistant Examiner* — Ce Li Li
(74) *Attorney, Agent, or Firm* — Sheppard Mullin Richter & Hampton LLP

(57) ABSTRACT

Sensor data is received at a processor of a vehicle including at least one sensor, a plurality of axles, and a plurality of tires coupled to the plurality of axles. A determination is made by the processor if at least one tire from the plurality of tires is faulty based on the sensor data. A determination is made by the processor of at least one side of the vehicle and at least one axle from the set of axles associated with the at least one tire in response to the determining that the at least one tire is faulty. A determination is made by the processor of at least one remedial action to be performed by the vehicle based on the sensor data, the at least one side, and the at least one axle.

20 Claims, 5 Drawing Sheets

(56) References Cited

U.S. PATENT DOCUMENTS

| | | | |
|---|---|---|---|
| 2020/0023859 A1* | 1/2020 | Schmitt | B60W 10/04 |
| 2020/0192360 A1 | 6/2020 | Zheng et al. | |
| 2020/0319638 A1* | 10/2020 | Bowen | B60W 30/095 |
| 2021/0174140 A1* | 6/2021 | DeLuca | G06K 9/6221 |
| 2021/0181737 A1* | 6/2021 | Patnaik | G05D 1/0055 |
| 2021/0188252 A1* | 6/2021 | Lu | B60W 40/12 |
| 2021/0370922 A1* | 12/2021 | Smith | B60W 30/18109 |
| 2021/0405185 A1* | 12/2021 | Price | G05D 1/0257 |
| 2022/0036664 A1* | 2/2022 | Jankowski | B60C 23/0479 |

* cited by examiner

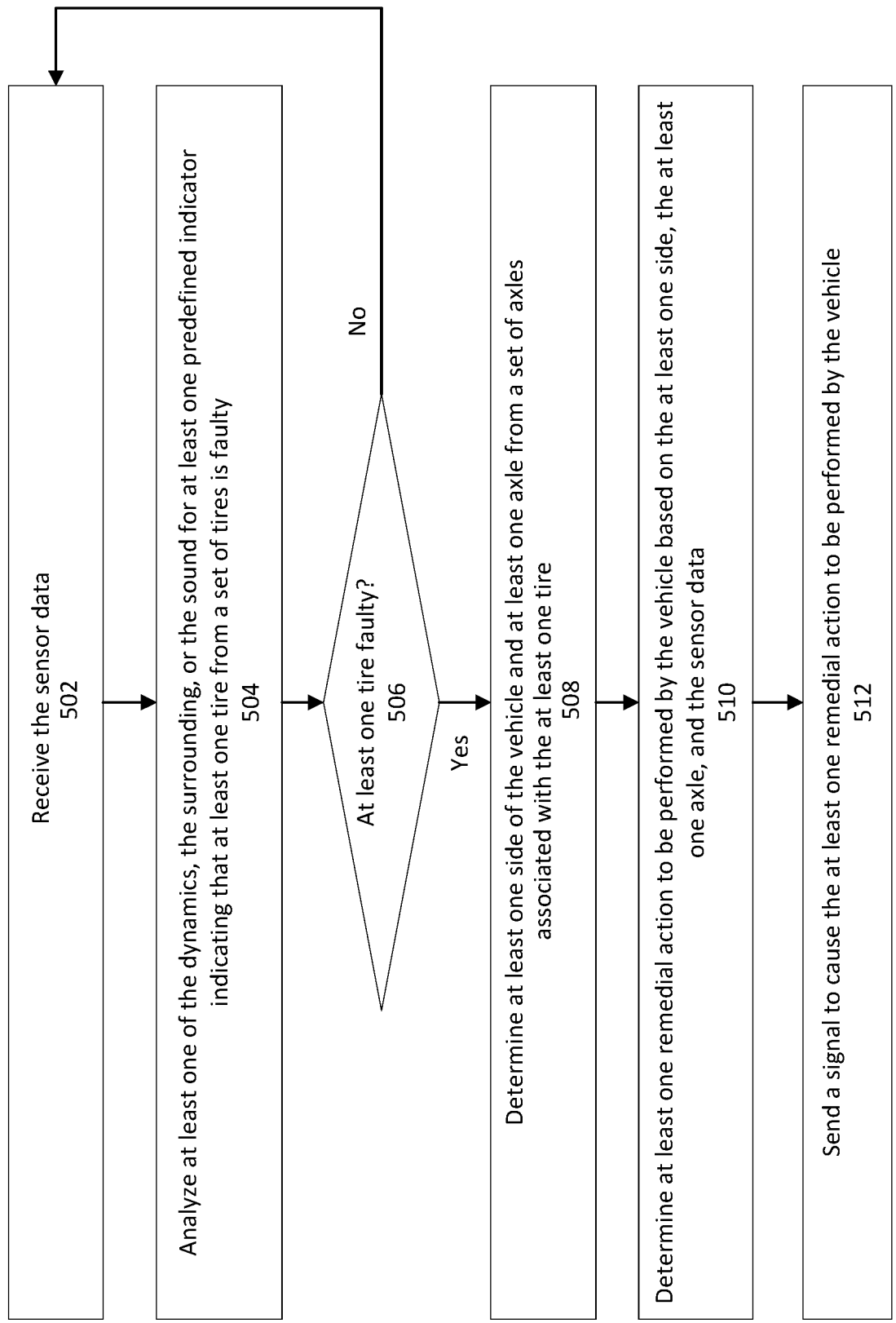

CONTROLLING A VEHICLE BASED ON DATA PROCESSING FOR A FAULTY TIRE

FIELD

In one or more embodiments, a vehicle is controlled to perform one or more remedial actions based on one or more software models determining that at least one tire included in the vehicle is faulty.

BACKGROUND

A faulty tire can pose risks for all types of vehicles, such as passenger cars, and semi-trucks. These risks can include the vehicle swerving and/or rolling over.

Some risks can be aggravated for heavier vehicles, such as semi-trucks, due to their larger sizes, relatively heavier weights, and loads that are often hauled by such heavier vehicles. Furthermore, such heavier vehicles sometimes include a truck (e.g., tractor), where the truck can be attached to various types of trailers having different size, weights, shapes, number of tires, sensors, etc. Not all trailers, however, have circuitry configured detect if a tire at the trailer is faulty and/or to notify the truck that a tire included in the trailer is faulty.

SUMMARY

In some embodiments, a method includes receiving sensor data at a processor of a vehicle including at least one sensor, a plurality of axles, and a plurality of tires coupled to the plurality of axles. The sensor data includes a representation of at least one of dynamics of the vehicle, a surrounding of the vehicle, or audio associated with the vehicle. A determination is made by the processor if at least one tire from the plurality of tires is faulty based on the sensor data. A determination is made by the processor of at least one side of the vehicle and at least one axle from the set of axles associated with the at least one tire in response to the determining that the at least one tire is faulty. A determination if made by the processor of at least one remedial action to be performed by the vehicle based on the sensor data, the at least one side, and the at least one axle. A signal is sent by the processor to cause the at least one remedial action to be performed by the vehicle in response to the determining that the at least one tire is faulty.

BRIEF DESCRIPTION OF THE DRAWINGS

FIG. 5 shows a flowchart of a method for controlling a vehicle based on detecting one or more faulty tires at the vehicle, according to an embodiment.

DETAILED DESCRIPTION

Faulty tires of a vehicle can be detected based on dynamics of the vehicle, a surrounding the vehicle, and/or audio associated with the vehicle. A software model can analyze the dynamics, surrounding, and/or audio to determine that at least one tire is faulty. If at least one tire is determined to be faulty, the software model can also determine attributes associated with the at least one tire determined to be faulty, such as a side of the vehicle the faulty tire(s) is located and/or an axle of the vehicle the faulty tire(s) is located. Further, if at least one tire is faulty, the vehicle can perform one or more remedial actions.

The techniques described herein can be applied to any type of vehicle, including vehicles that have trucks attached to trailers (e.g., semi-trucks). The techniques described herein can be desirable for trucks that attach to trailers because the truck can detect if a tire at an attached trailer includes a faulty tire without requiring, for example, a driver of the truck to leave the truck and check the trailer, the attached trailer to include circuitry (e.g., sensors, processor) for detecting a faulty tire, and/or the attached trailer to include circuitry for sending/or and receiving signals to/from the truck. In some scenarios, without using the techniques described herein, a truck/passenger of the truck may not know that a trailer attached to the truck has a faulty tire.

Figure 1:
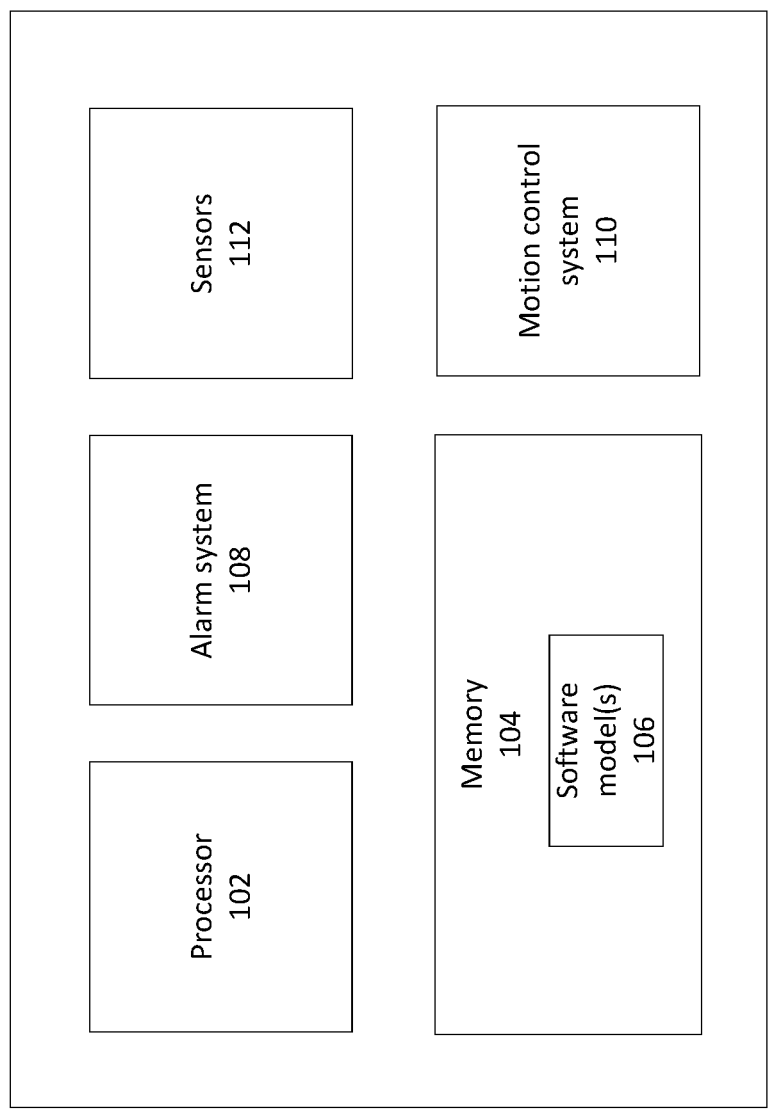
FIG. 1 shows a block diagram of a vehicle that can be controlled to perform one or more remedial actions based on data processing for a faulty tire, according to an embodiment.

FIG. 1 shows a block diagram of a vehicle 100 that can detect if at least one tire included in the vehicle 100 is faulty, according to an embodiment. The vehicle 100 includes a processor 102, memory 104, alarm system 108, motion control system 110, and sensor(s) 112. The processor 102, memory 104, alarm system 108, sensor(s) 112, and at least a portion of the motion control system 110 are operatively coupled to one another (e.g., via a system bus). The vehicle 100 can operate in a fully autonomous mode (and not a semi-autonomous or manual mode), a semi-autonomous mode (and not a fully autonomous or manual mode), a manual mode (and not a fully autonomous or semi-autonomous mode), or a combination thereof.

In some implementations, the vehicle 100 can be a medium truck, heavy truck, very heavy truck, semi-truck, greater than 14,000 pounds, greater than 26,000 pounds, greater than 70,000 pounds, or greater than 80,000 pounds.

In some implementations, the vehicle 100 includes a trailer (e.g., for holding a load) and a truck, where the truck has an engine and the trailer does not. In some implementations, the techniques described herein can monitor all axles of the vehicle 100 for a faulty tire. In some implementations, the techniques described herein can monitor a subset of the axles of the vehicle 100 for a faulty tire (e.g., only the axles at the trailer). In some implementations, the truck (not the trailer) includes the processor 102, alarm system 108, sensor (s) 112, and memory 104, and the trailer does not include any circuitry configured detect if a tire at the trailer is faulty and/or to notify the truck that a tire included in the trailer is faulty.

The motion control system 110 includes components for controlling the movement of the vehicle 100, such as a steering wheel, steering column, brake pedal, acceleration pedal, engine, axles, wheels, tires, etc. The motion control system 110 can be used to control movement of the vehicle 100, such as speeding up, slowing down, moving forward, moving backward, and turning. In a scenario where a tire of the vehicle 100 is determined to be faulty, the processor 102 may send a signal to cause the motion control system 110 to perform at least one remedial action, such as decelerating and/or navigating to a shoulder area.

The alarm system 108 can include at least one of a display, speaker, vibration device, or hazard lights. The alarm system 108 can be located at an interior portion of the vehicle 100, exterior portion of the vehicle 100, or a combination thereof. The display can output information visually to a passenger (e.g., driver) of the vehicle 100 and/or others surrounding the vehicle 100. In some implementations, where the vehicle 100 includes a truck and a trailer, the display is located within the cab of the truck. The speaker can output information audibly to the passenger of the vehicle 100 and/or others surrounding the vehicle 100. In some implementations, where the vehicle 100 includes a truck and a trailer, the speaker can be located within the cab of the truck and/or at an exterior portion of the truck. The vibration device can cause vibrations to be felt by the passenger. In some implementations, the vibration device is located at an interior portion of the vehicle 100 such that vibrations can be felt by a passenger (e.g., driver). The hazard lights can be located at an exterior portion of the vehicle 100 and can provide warning to other vehicles, pedestrians, etc. near the vehicle 100 (e.g., within visual range) to proceed with caution. In a scenario where a tire of the vehicle 100 is determined to be faulty, the processor 102 may send a signal to cause the alarm system 108 to perform at least one remedial action, such as displaying a warning or outputting an audio message.

The sensor(s) 112 can include one or more sensors for collecting sensor data. The sensor(s) 112 can be used to observe and gather any information that would be useful for performing the techniques discussed herein, such as information associated with a surrounding environment of the vehicle 100 and/or the vehicle 100 itself. The sensor(s) 112 can include, for example, at least one of a camera, a radar, a lidar, a tire pressure sensor, a microphone, an inertial measurement unit (IMU), or a gyroscope. The sensor(s) 112 can collect sensor data that includes representations of attributes associated with the vehicle 100, such as the vehicle's 100 speed, location, acceleration, size, weight, tire pressure, torque of steering wheel, angle of steering wheel, vehicle height, wheel speed, sound, etc. The sensor(s) 112 can collect sensor data that includes representations of attributes associated with a surrounding of the vehicle 100, such as a speed, location, acceleration, size, type, relative distance, movement pattern, sound, etc. of other vehicles, pedestrians, animals, obstacles, etc., or location, type, relative distance, size, etc. of signs, lane markers, shoulder areas, etc. In some implementations, the sensor data includes information from a control area network (CAN).

The processor 102 can be, for example, a hardware based integrated circuit (IC) or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 104 can be, for example, a random-access memory (RAM), a memory buffer, a hard drive, a read-only memory (ROM), an erasable programmable read-only memory (EPROM), and/or the like. The memory 104 can be configured to store sensor data collected by the sensor(s) 112, data received from a separate compute device (not shown in FIG. 1), and any other data used by the processor 102 to perform the techniques discussed herein. In some instances, the memory 104 can store, for example, one or more software programs and/or code that can include instructions to cause the processor 102 to perform one or more processes, functions, and/or the like. In some embodiments, the memory 104 can include extendible storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with the compute device. For example, a remote database device (not shown) can serve as a memory and be operatively coupled to the vehicle 100.

The memory 104 also includes a software model(s) 106. The software model(s) 106 can be, for example, an artificial intelligence (AI) model, machine learning (ML) model, analytical model, or mathematical model. The software model(s) 106 can be used to determine that at least one tire of the vehicle 100 is faulty (e.g., blown out, flat) based on sensor data collected by the sensor(s) 112. In addition, the software model(s) 106 can be used to determine where each faulty tire is located, such as the specific axle and side of the vehicle 100 for each faulty tire. For example, the software model(s) 106 can determine that a tire included in the vehicle 100 faulty, the faulty tire is located at the left side of the vehicle 100, and the faulty tire is located at the rear-most axle of the vehicle 100.

In some implementations, the software model(s) 106 can consider a variety of factors independently or in combination to determine that a tire is likely faulty, such as dynamics of the vehicle 100, a surrounding of the vehicle 100, or audio associated with the vehicle 100. In some implementations, the software model(s) 106 generates a confidence metric indicating a likelihood that a tire is faulty, and the tire determined to be faulty if the confidence metric is within a predetermined range (e.g., more than 99%, 95%, 90%, 80%, etc. confident that a tire has blown out). In some implementations, certain attributes of the vehicle's 100 dynamics, surroundings, and/or associated audio can cause the confidence metric to be increased, while other attributes of the vehicle's 100 dynamics, surroundings, and/or associated audio can cause the confidence metric to be decreased.

In some implementations, the software model(s) 106 can consider sensor data indicating dynamics of the vehicle 100 when determining a likelihood that a tire is faulty, such as an acceleration, a roll, a pitch, a yaw, or a steering wheel torque of the vehicle 100. Detecting certain dynamics can indicate to the software model(s) 106 a greater likelihood that a tire is blown out, such as an excessive vibration, the steering wheel torque increasing, deceleration of the vehicle, the yaw increasing, the roll increasing, the pitch being forward, or any other dynamic that could indicate that a tire of the vehicle 100 is faulty. In some implementations, the software model(s) 106 can analyze the acceleration, the roll, the pitch, the yaw, the steering wheel torque, or a combination thereof for a predetermined relationship suggesting that at least one tire is faulty. The predetermined relationship could be, for example, the steering wheel torque increasing, deceleration of the vehicle, the yaw increasing, the roll increasing, and the pitch being forward.

In some implementations, the software model(s) 106 can consider sensor data indicating a surrounding of the vehicle 100 when determining a likelihood that a tire is faulty, such as detecting for debris/dust/smoke near the vehicle 100 and/or analyzing other vehicles' reactions/behaviors (if present). Detecting certain attributes can indicate to the software model(s) 106 a greater likelihood that a tire is blown out, such as debris/dust/smoke being produced near a tire of the vehicle 100, other vehicles honking, other vehicles moving away from the vehicle 100, a combination thereof, or any other behavior of surrounding vehicles that could indicate that a tire of the vehicle 100 is faulty.

In some implementations, the software model(s) 106 can consider sensor data indicating audio associated of the vehicle 100 when determining a likelihood that a tire is faulty, such as sound caused by the vehicle 100. Detecting certain sounds can indicate to the software model(s) 106 a greater likelihood that a tire is blown out, such as an abrupt sound indicating that a tire has blown out, a scraping sound of a wheel scraping the ground, or repetition of a flapping sound indicating that a tire is flat.

The software model(s) 106 can also consider the dynamics, surrounding, and/or audio associated with the vehicle 100 when determining the axle and/or side of the faulty tire. As an example, a faulty tire at a left side of the vehicle 100 could cause the vehicle 100 to roll left and/or spin counterclockwise. As another example, a faulty tire at a right side of the vehicle 100 could cause the vehicle 100 to roll right and/or spin clockwise. As another example, a faulty tire at a front axle of the vehicle 100 could cause the vehicle 100 to pitch forward. As another example, a faulty tire at a rear axle of the vehicle 100 could cause the vehicle 100 to pitch backwards. As another example, a faulty tire at a left side of the vehicle 100 could cause debris/dust/smoke to be detected at a left side of the vehicle 100 and/or only cause other vehicles that are in front of, behind, and/or to the left of the vehicle 100 to react accordingly. As another example, a faulty tire at a right side of the vehicle 100 could cause debris/dust/smoke to be detected at a right side of the vehicle 100 and/or only cause other vehicles that are in front of, behind, and/or to the right of the vehicle 100 to react accordingly. As another example, a faulty tire at a left side of the vehicle 100 would cause a sound indicting that a tire is faulty to be generated from a left side of the vehicle. As another example, a faulty tire at a right side of the vehicle 100 would cause a sound indicting that a tire is faulty to be generated from a right side of the vehicle The software model(s) 106 can also consider the dynamics, surrounding, and/or audio associated with the vehicle 100 when determining the axle of the faulty tire. The vehicle 100 can include two or more axles. In some implementations, where the vehicle 100 includes a truck and a trailer, the truck can include two or more axles and the trailer can include two or more axles. In some implementations, because a faulty tire at one axle can cause the vehicle 100 to have different dynamics compared to a faulty tire at a different axle, dynamics can be used to determine which axle is associated with the faulty tire. In some implementations, the roll, pitch, and/or yaw of the vehicle 100 can be collected (e.g., via a gyroscope, inertial measurement unit) and analyzed. For example, a forward pitch of the vehicle 100 could indicate a faulty tire at a front axle, while a backward pitch of the vehicle 100 could indicate a faulty tire at a rear axle of the vehicle 100. Moreover, a faulty tire at a front axle of the vehicle 100 may affect steering much more compared to a faulty tire at a rear axle of the vehicle 100. For example, a greater torque at a steering column may indicate that a tire at a front axle of the vehicle 100 is faulty, while a lesser torque at the steering column may indicate that a tire at a rear axle of the vehicle 100 is faulty. In some implementations, a surrounding of the vehicle 100 can be used to determine which axle is associated with the faulty tire by determining the axle closest to debris/dusk/smoke being generated. In some implementations, audio associated with the vehicle 100 can be used to determine which axle is associated with the faulty tire based on a magnitude (i.e., loudness) of the audio captured by a microphone indicating that a tire is likely faulty, where a larger magnitude indicates the axle associated with the faulty tire is closer to the microphone and a smaller magnitude indicates the axle associated with the faulty tire is farther from the microphone. If, for whatever reason, the axle of the faulty tire cannot be determined, in some implementations, a remedial action that mitigates a risk and/or causes the vehicle 100 to operate more safely can be performed (e.g., pulling over to a shoulder and/or safe area, decreasing speed of the vehicle 100, alerting a passenger and/or driver included in the vehicle 100, turning on hazard lights, etc.).

In some implementations, the software model(s) 106 can estimate a set of weights (e.g., of a load carried by the vehicle) held at at least one axle and/or left and right portion of at least one axle included in the vehicle 100 as the vehicle 100 is driving. Knowing that a flat or blown out tire would cause an axle and/or portion of the axle to carry less weight, a sudden change of weight held by at least one axle and/or left and right portion of at least one axle can indicate to the software model(s) 106 a greater likelihood that a tire is faulty. Knowing which axle and portion of the axle had a decrease in weight can also be used by the software model(s) 106 in determining the side and axle of the vehicle 100 associated with the faulty tire.

In some implementations, the estimated set of weights includes estimated weights at the axles and/or portions of the axles (i.e., left portion and right portion of each axle) for the entire vehicle 100. For example, if the vehicle 100 includes a front axle and a rear axle, the software model(s) 106 can estimate a weight at the front left axle, the front right axle, the rear left axle, and the rear right axle, as well as a weight at the front axle (e.g., by adding the weight at the front left axle and the weight at the front right axle), and rear axle (e.g., by adding the weight at the rear left axle and the weight at the rear right axle). In some implementations, where the vehicle 100 includes a tractor and a trailer, the estimated set of weights includes estimated weights at the axles and/or portions of the axles (i.e., left portion and right portion of each axle) for the trailer (and not the tractor). For example, if the vehicle 100 includes a tractor with a front and rear axle, and a trailer with a front and rear axle, the software model(s) 106 can estimate a weight at the front and rear axles of the trailer without estimating a weight at the front and rear axles of the tractor.

In some implementations, the estimated set of weights include absolute values (e.g., 1,050 pounds at front left axle, 950 pounds at front right axle, 1,000 pounds at rear right axle, and 975 pounds at rear left axle). In some implementations, the estimated set of weights include relative values (e.g., 30% of total weight at front left axle, 25% of total weight at front right axle, 25% of total weight at rear right axle, and 20% of total weight at rear left axle). In some implementations, absolute values of weights at the axles and/or left and right portions of the axles can be estimated using (1) pre-measured weights at the axles and/or left and right portions of the axles of the vehicle 100 when stationary (e.g., via a scale), and (2) relative values of weights at the axles and/or left and right portions of the axles. For example, if 60% of the total weight is at the front axle during a drive, 40% of the total weight is at the back axle during the drive, and the total weight of the vehicle 100 was measured to be 30,000 pounds prior to the drive, the software model(s) 106 can approximate that 18,000 pounds are at the front axle and 12,000 pounds are at the rear axle.

In some implementations, the software model(s) 106 can estimate the set of weights associated with the axles as the vehicle 100 drives using an air spring suspension system included in the vehicle 100 (not shown in FIG. 1). The air spring suspension system can include an air pump or compressor, where the air pump or compressor can pump air into flexible bellows (not shown in FIG. 1) of the air spring suspension system. The air can inflate the bellows and raise a chassis (not shown in FIG. 1) of the vehicle 100 from the axles. The air spring suspension system can output air pressure values near the left and right portions of each axle. The air pressure values can then be used by the software model(s) 106 to estimate an absolute and/or relative set of weights at the left and right portions of axles that are of interest.

In some implementations, the software model(s) 106 can estimate the set of weights associated with the axles (as the vehicle 100 drives) using a frequency response function associated with a center of gravity of the vehicle 100. The frequency response function associated with the center of gravity indicates a vertical frequency of the vehicle 100 and a roll frequency of the vehicle 100. A vertical frequency value provided by the frequency response function and a roll frequency value provided by the frequency response function can indicate a weight distribution of the vehicle 100, and a difference between the vertical frequency value and the roll frequency value being outside a predetermined range can indicate that an abnormal weight distribution exists.

In some implementations, the software model(s) 106 can estimate the set of weights associated with the axles (as the vehicle 100 drives) by analyzing a height change associated with the vehicle 100. In some implementations, the sensor(s) 112 can collect sensor data indicating a set of heights at various points of the vehicle 100 when the vehicle 100 is not moving, such as the highest points of the vehicle 100 above the left and right portions of axles that are of interest (e.g., all axles of the vehicle 100, only axles at a trailer of the vehicle 100). Knowing heights at these various points of the vehicle 100, as well as weights at various points of the vehicle 100 when stationary (e.g., via pre-measured weights at the axles and/or left and right portions of the axles measured using a scale), a set of weights can be estimated as the vehicle 100 is driving by analyzing changes in height at the various points of the vehicle. Knowing that additional weight decreases height, a set of weights including absolute and/or relative values can be estimated based on the change in height at the various points.

In some implementations, the software model(s) 106 can estimate the set of weights associated with the axles by analyzing a tire pressure change between tires included in the vehicle 100. In some implementations, tire pressures values can be captured at each tire of the vehicle 100 prior to driving, and again during driving. Knowing that adding weight at a tire could increase that tire's pressure, a tire pressure increase during driving can indicate that additional weight has been added near that tire (and vice versa). The amount of tire pressure increase and/or decrease can be used to estimate the set of weights.

In some implementations, the software model(s) 106 can estimate the set of weights associated with the axles by analyzing a relative wheel speed difference between two or more wheels included in the vehicle 100. Weight can cause a tire of the vehicle 100 to compress, which can cause a radius/diameter of the tire/wheel to change. A smaller radius/diameter can mean the tire/wheel needs to rotate faster relative to a tire/wheel with a larger radius/diameter (and vice versa). In some implementations, the sensor(s) 112 can capture sensor data indicating wheel speeds at each wheel of the vehicle 100 and/or each wheel of a trailer included in the vehicle 100, and the software model(s) 106 can analyze the wheel speeds to determine if differences exist. If differences do not exist, weights at the axles/left and right portions of the axles are likely to be similar to the weights of the axles and/or left and right portions of the axle measured when stationary. If, however, differences do exist, weights at the axles/left and right portions of the axles are likely to have deviated from the measured weights (e.g., where wheels with faster wheel speeds have larger weights compared to wheels with slower wheel speeds). Furthermore, the amount of difference in wheel speed between wheels can also be used to estimate absolute and/or relative values for the set of weights.

In some implementations, after the software model(s) 106 determines that a tire is faulty, at least one remedial action is performed (e.g., automatically without requiring human input). In some implementations, after the software model(s) 106 determines that a tire is faulty, what side of the vehicle 100 the faulty tire is at, the axle associated with the faulty tire, or a combination thereof, at least one remedial action is performed (e.g., automatically without requiring human input).

In some implementations, after the software model(s) 106 determines that a tire is faulty, what side of the vehicle 100 the faulty tire is at, the axle associated with the faulty tire, or a combination thereof, the software model(s) 106 can determine what remedial action should be performed. In some implementations, the remedial action can be chosen based on sensor data collected by the sensor(s) 112, what side of the vehicle 100 the faulty tire is at, the axle associated with the faulty tire, or a combination thereof. In some implementations, a remedial action can be chosen that minimizes and/or does not increase the amount of estimated weight at the side and/or axle associated with the faulty tire. In some implementations, a remedial action can be chosen that does not increase a center of gravity of the vehicle 100. In some implementations, a remedial action can be chosen that does not increase a likelihood that the vehicle 100 will fishtail, sway, and/or rollover. In some implementations, a remedial action can be chosen that is possible to perform safely for a given scenario (as detected by the sensor(s) 112). In some implementations, a remedial action can be chosen that does not cause the vehicle 100 to perform any maneuvers that are predetermined to be prohibited for a given side and/or axle of the vehicle 100 associated with a faulty tire (e.g., if the faulty tire is at the left side, the remedial action does not force the vehicle 100 to turn left; if the faulty tire is at the rear-most axle of the vehicle 100, the remedial action does not force the vehicle 100 to decelerate faster than a predetermined deceleration rate). In some implementations, a remedial action can be chosen that does not increase the amount of estimated weight at an axle and/or left and right portion of the axle beyond a predetermined limit (e.g., 4,250 pounds, 6,000 pounds, 8,500 pounds, 12,000 pounds).

Upon determining that at least one remedial action should be performed, the processor 102 can cause the at least one remedial action to be performed. In some implementations, the processor can send a signal to the alarm system 108 and/or motion control system 110 to cause the at least one remedial action to be performed.

In some implementations, the at least one remedial action includes automatically and/or autonomously decreasing a speed of the vehicle 100 without requiring human input. In some implementations, the processor 102 can send a signal to the motion control system 110 to cause the vehicle 100 to slow down to a speed beneath a predetermined speed threshold if the vehicle 100 is travelling faster than the predetermined speed limit.

In some implementations, the at least one remedial action includes automatically causing the motion control system 110 to adjust the vehicle's 100 dynamics without requiring human input. For example, the processor 102 can send a signal to the motion control system 110 to cause the vehicle 100 to decrease the vehicle's speed and/or acceleration. As another example, the processor 102 can send a signal to the motion control system 110 to cause the vehicle 100 to decrease a roll angle of the vehicle 100 and/or a steering wheel angle of a steering wheel included in the motion control system 110.

In some implementations, the at least one remedial action includes automatically navigating the vehicle 100 to a predetermined safe location without requiring human input. In some implementations, the predetermined safe location can be a safe place to stop, such as a shoulder or parking lot. In some implementations, the predetermined safe location can be a road with less turns, a flatter bank, less traffic, a lower speed limit, etc.

In some implementations, the at least one remedial action includes alerting a passenger of the vehicle 100 using the alarm system 108. In some implementations, the at least one remedial action includes using the alarm system 108 to output information visually to the passenger to inform the passenger that at least one tire is faulty, attributes associated with the at least one tire (e.g., side and axle), recommended actions for the passenger, etc. In some implementations, the at least one remedial action includes using the alarm system 108 to output information audibly to the passenger to inform the passenger that at least one tire is faulty, attributes associated with the at least one tire (e.g., side and axle), recommended actions for the passenger, etc. In some implementations, the at least one remedial action includes using the alarm system 108 to cause vibrations to be felt by the passenger, which can be used to increase the passenger's alertness. In some implementations, the at least one remedial action includes using the alarm system 108 to turn on hazard lights.

In some implementations, the vehicle 100 is operating in a first mode prior to performing the at least one remedial action, and the at least one remedial action causes the vehicle 100 to operate and/or initiate a process to operate in a second mode different than the first mode. The first mode could be four-wheel drive, two-wheel drive, an autonomous driving mode, a semi-autonomous driving mode, a manual driving mode, cruise control, etc. The second mode could be four-wheel drive, two-wheel drive, an autonomous driving mode, a semi-autonomous driving mode, a manual driving mode, cruise control, etc.

In some implementations, the vehicle 100 is operating in an autonomous driving mode prior to performing the at least one remedial action, and the at least one remedial action initiates causing a passenger of the vehicle 100 to perform a series of tasks to cause the vehicle 100 to operate in a manual driving mode if the passenger performs the series of tasks. In some implementations, a set of tasks required to switch the vehicle from operating in the autonomous driving mode to the manual driving mode are determined, and the set of tasks are made known to the driver via the alarm system 108. Additional details related to performing a series of tasks to switch an operating mode of the vehicle 100 are discussed in U.S. patent application Ser. No. 16/799,067, the contents of which are incorporated by reference herein in its entirety.

In some implementations, the vehicle 100 is operating in a first mode prior to performing the at least one remedial action, and the at least one remedial action causes the vehicle 100 to be prevented from and/or refrain from operating in a second mode different than the first mode. The first mode could be four-wheel drive, two-wheel drive, an autonomous driving mode, a semi-autonomous driving mode, a manual driving mode, cruise control, etc. The second mode could be four-wheel drive, two-wheel drive, an autonomous driving mode, a semi-autonomous driving mode, a manual driving mode, cruise control, etc.

In some implementations, after estimating a set of weights held at one or more axles and/or left and right portions of axles of the vehicle 100, a determination can be made whether the set of weights indicate that the vehicle 100 is unbalanced. In some implementations, the vehicle 100 is unbalanced if the set of weights indicate that a left portion of an axle is holding more weight and/or substantially (e.g., 5%, 10%, 15%, 20%, etc.) more weight than a right portion of that axle (or vice versa). In some implementations, the vehicle 100 is unbalanced if a first axle of the vehicle (e.g., rear axle) is holding more weight than a second axle of the vehicle (e.g., front axle). In some implementations, the vehicle 100 is unbalanced if a first axle of the vehicle (e.g., front axle) is not holding substantially (e.g., 5%, 10%, 15%, 20%, etc.) more weight than a second axle of the vehicle (e.g., rear axle). Determining that the vehicle 100 is unbalanced could cause at least one remedial action to be performed.

Figure 2:
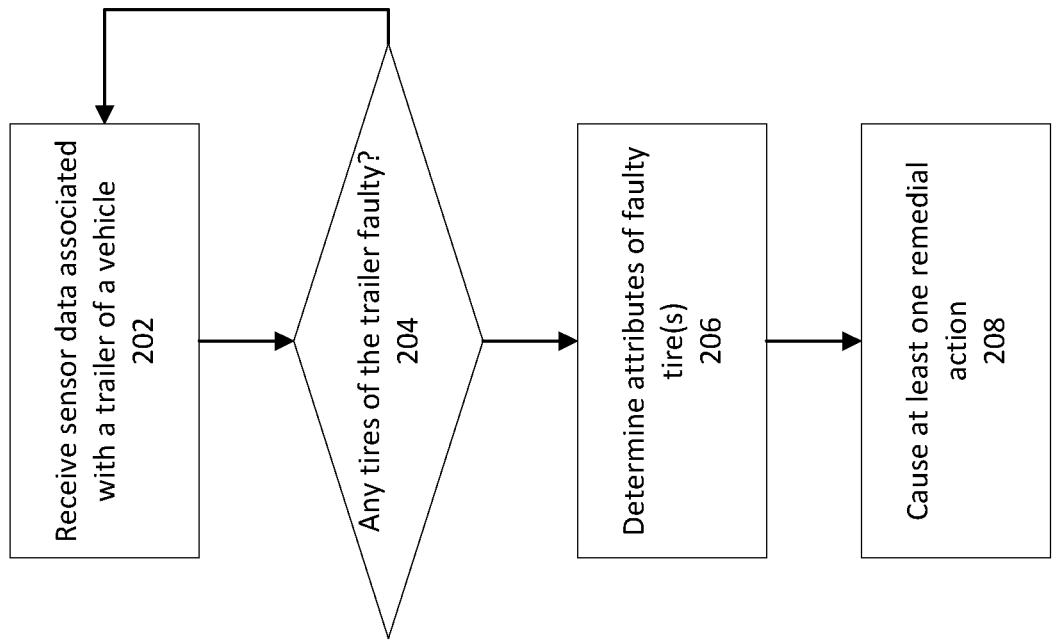
FIG. 2 shows a flowchart of a method for controlling a vehicle based on detecting one or more faulty tires at a trailer of a vehicle, according to an embodiment.

In some implementations, the vehicle 100 can include a truck and trailer coupled to the truck, where the truck can include an engine but the trailer does not. The processor 102, alarm system 108, sensor(s) 112, memory 104, and at least a portion of the motion control system 110 (e.g., steering wheel, engine, axles, wheels attached to the axles, tires fit over the wheels) are included in the truck, while the trailer can include axles, wheels attached to left and right portions of the axles, and tires fit over the wheels. The trailer does not include any circuitry configured detect if a tire at the trailer is faulty and/or to notify the truck that a tire included in the trailer is faulty. For such a vehicle, FIG. 2 shows a flowchart of a method for causing at least one remedial action in response to determining that a tire at the trailer is faulty, according to an embodiment. The method discussed with respect to FIG. 2 can be performed by a processor (e.g., processor 102) located at the truck.

At 202, sensor data associated with the trailer is received. The sensor data can include representations of dynamics of the trailer, a surrounding of the trailer, audio associated with the trailer, or a combination thereof. For example, the sensor data can include representations of a speed of the trailer, acceleration of the trailer, roll of the trailer, pitch of the trailer, yaw of the trailer, debris/dust/smoke caused by the trailer, behavior of objects near the trailer, sounds caused by the trailer, etc. In some implementations, the sensor data can also include a representation of a steering wheel torque of a steering wheel included at the truck.

At 204, a determination is made if any of the tires at the trailer are faulty. This determination at 204 can be performed using the sensor data received at 202 and a software model (e.g., software model(s) 106) configured to detect faulty tires at trailers based on dynamics associated with the trailer, a surrounding associated with the trailer, audio associated with the trailer, or a combination thereof. A tire at the trailer can be detected to be faulty by the software model if, for example, the steering wheel torque of the trailer and/or truck has increased, the acceleration at the trailer and/or truck has decreased, the yaw at the trailer and/or truck has increased, the roll at the trailer and/or truck has increased, the trailer and/or truck has a forward pitch, debris/dust/smoke is being produced near a tire of the trailer, other vehicles near the trailer and/or truck are honking, other vehicles previously near the trailer and/or truck are moving away from the trailer and/or truck, a predetermined sound pattern and/or a predetermined sound is detected (e.g., an abrupt sound indicating that a tire has blown out, a scraping sound of a wheel scraping the ground, repetition of a flapping sound indicating that a tire is flat), etc.

If 204 is yes, the method proceeds to 206. If 204 is no, the method returns to 202.

At 206, one or more attributes of the faulty tire(s) are determined. In some implementations, the attribute(s) can include a side of the trailer that the faulty tire(s) is located and/or an axle of the trailer that the faulty tire(s) is located. In some implementations, the one or more attributes can be determined using the sensor(s) 112 (e.g., camera, lidar, radar, microphone, IMU). In some implementations, 206 is optional, in which 204 proceeds to 208 if 204 is yes.

At 208, at least one remedial action is caused to be performed. In some implementations, the at least one remedial action to be performed is based on the one or more attributes of the faulty tire(s). In some implementations, the at least one remedial action is predetermined (i.e., the at least one remedial action is determined prior to 202, 204, 206, and/or 208) and performed automatically in response to 206 being complete and/or 204 being yes.

Figure 3:
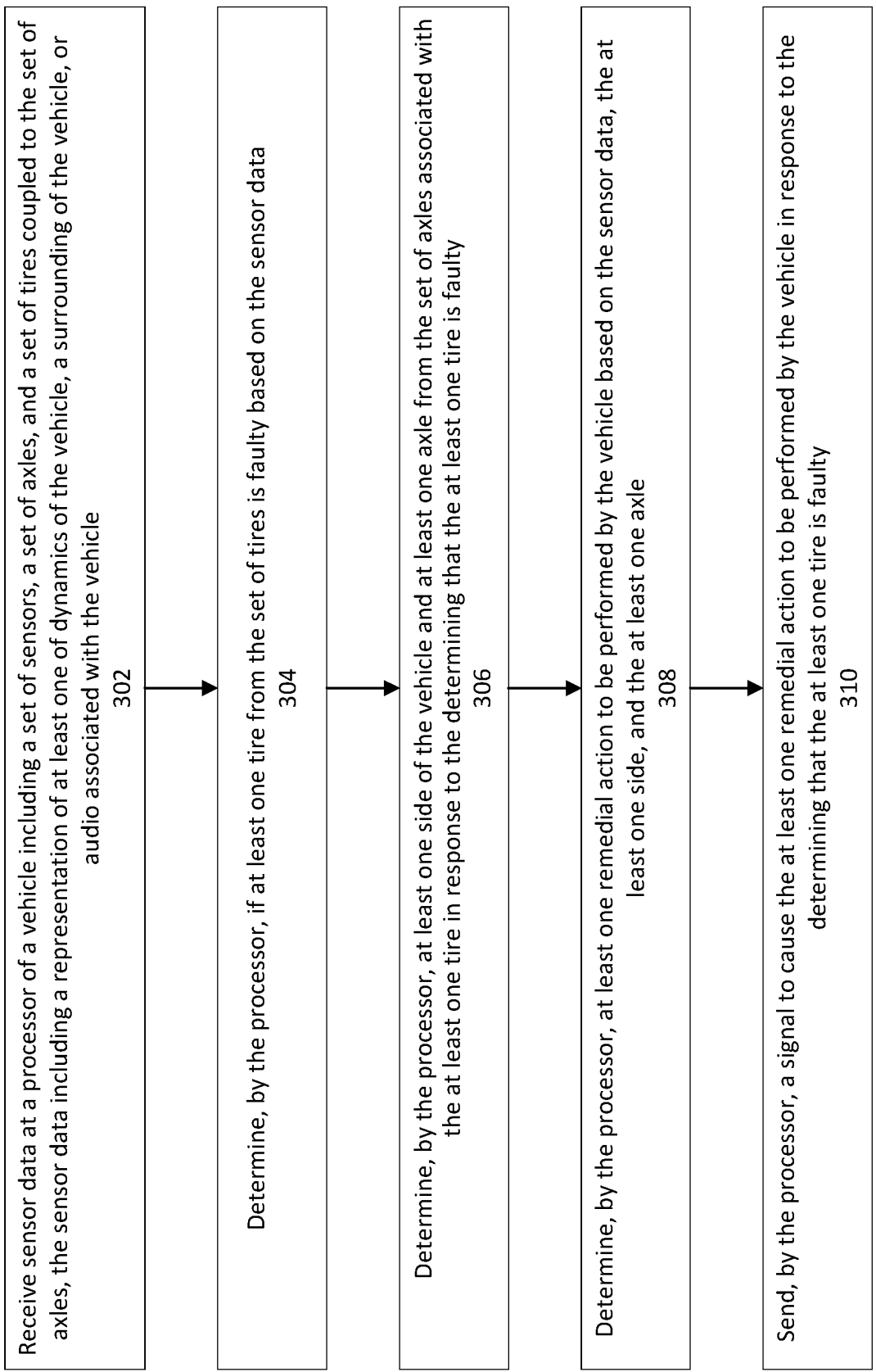
FIG. 3 shows a flowchart of a method for controlling a vehicle based on detecting one or more faulty tires at the vehicle, according to an embodiment.

FIG. 3 shows a flowchart of a method for detecting a faulty tire at a vehicle (e.g., vehicle 100), according to an embodiment. The method discussed with respect to FIG. 3 can be performed by a processor (e.g., processor 102) included at the vehicle.

At 302, sensor data is received at a processor (e.g., processor 102) of a vehicle (e.g., vehicle 100) including at least one sensor (e.g., sensor(s) 112), a plurality of axles, a plurality of wheels coupled to the plurality of axles, and a plurality of tires coupled to the plurality of wheels. The sensor data can include, for example, a representation of at least one of dynamics of the vehicle, a surrounding of the vehicle, or audio associated with the vehicle. The plurality of axles includes at least one wheel at a left portion of each axle from the plurality of axles and at least one wheel at a right portion of each axle from the plurality of axles. Furthermore, the plurality of tires are mounted on the wheels at the plurality of axles. The representation of the dynamics can include a speed, acceleration, roll, pitch, yaw, steering wheel torque, etc. associated with the vehicle. The representation of the surrounding can represent, for example, debris/dust/smoke caused by the vehicle and/or behavior of objects near the vehicle. The representation of audio associated with the vehicle can include a recording of and/or represent, for example, sounds received and/or generated by the vehicle.

At 304, a determination is made by the processor if at least one tire from the plurality of tires is faulty based on the sensor data. The processor can use at least one software model (e.g., software model(s) 106) configured to detect faulty tires at the vehicle. A tire at the vehicle can be detected to be faulty by the software model if, for example, the steering wheel torque of the vehicle has increased, the acceleration of the vehicle has decreased, the yaw of the vehicle has increased, the roll of the vehicle has increased, the vehicle has a forward pitch, debris/dust/smoke is being produced near a tire of the vehicle, other vehicles near the vehicle are honking, other vehicles previously near the vehicle are moving away from the vehicle, a predetermined sound pattern is detected (e.g., an abrupt sound indicating that a tire has blown out, a scraping sound of a wheel scraping the ground, repetition of a flapping sound indicating that a tire is flat), etc.

At 306, at least one side of the vehicle and at least one axle from the plurality of axles associated with the at least one tire is determined (or identified) by the processor in response the determining that the at least one tire is faulty. Said similarly, if 304 determines that at least one tire from the plurality of tires is faulty, at 306, the side(s) and axle(s) of the vehicle where each faulty tire is located is determined (or identified). The at least one side and at least one axle can be determined (or identified).using at least one software model (e.g., software model(s) 106) based on sensor data received at 302.

At 308, at least one remedial action to be performed by the vehicle is determined by the processor based on the sensor data, the at least one side, and/or the at least one axle. Said similarly, the at least one remedial action to be performed can be determined while taking into consideration attributes of a surrounding of the vehicle and/or attributes of the vehicle itself, and/or a location(s) of the at least one tire determined to be faulty. For example, the at least one remedial action can cause the vehicle to perform an action that will cause minimum risk (or reduced risk) to other vehicles surrounding the vehicle, and that will minimize and/or not add additional force, pressure, and/or momentum to the at least one tire determined to be faulty.

At 310, a signal to cause the at least one remedial action to be performed by the vehicle is sent by the processor in response to the determining that the at least one tire is faulty. The signal could be sent, for example, from the processor to a motion control system (e.g., motion control system 110) so that the vehicle can perform a driving maneuver and/or to an alarm system (e.g., alarm system 108) so that a passenger, driver, nearby person, etc. is notified of the faulty tire and/or other actions that should and/or are recommended to take place. In some implementations, the at least one remedial action includes the vehicle sending a signal (e.g., via a communication interface included in the vehicle and over a network) to another compute device (e.g., server and/or another vehicle) wirelessly connected to the vehicle's processor (e.g., processor 102) indicating, for example, that at least one tire is faulty, attributes associated with the at least one faulty tire (e.g., side, axle), attributes associated with the vehicle (e.g., location, dynamics), etc.

Figure 4:
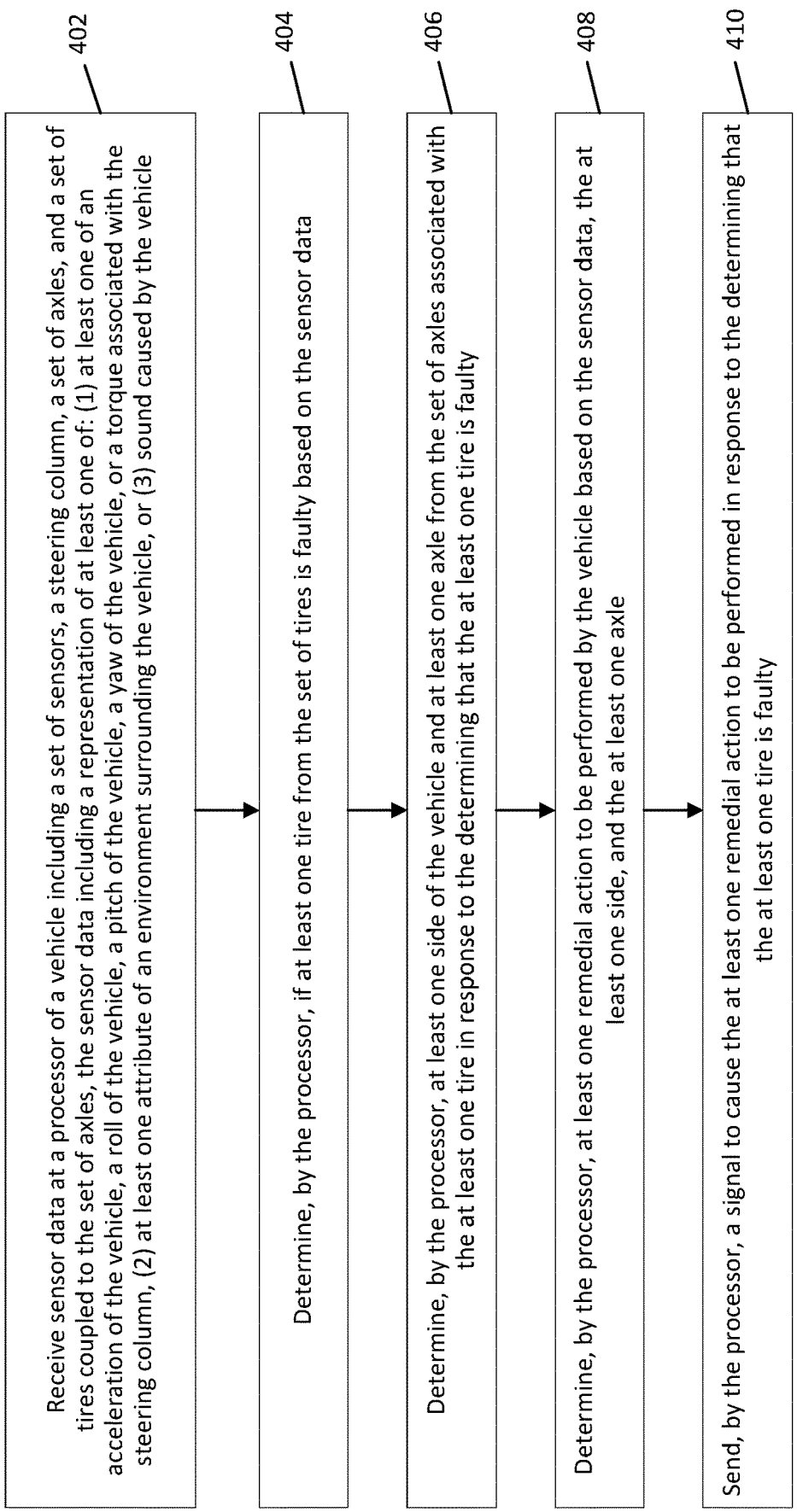
FIG. 4 shows a flowchart of a method for controlling a vehicle based on detecting one or more faulty tires at the vehicle, according to an embodiment.

FIG. 4 shows a flowchart of a method for detecting a faulty tire at a vehicle (e.g., vehicle 100), according to an embodiment. The method discussed with respect to FIG. 4 can be performed by a processor (e.g., processor 102) included at the vehicle.

At 402, sensor data is received at a processor of a vehicle including at least one sensor, a steering column, a plurality of axles, a plurality of wheels coupled to the plurality of axles, and a plurality of tires coupled to the plurality of wheels. The sensor data can include, for example, a representation of at least one of: (1) at least one of an acceleration of the vehicle, a roll of the vehicle, a pitch of the vehicle, a yaw of the vehicle, or a torque associated with the steering column, (2) at least one attribute of an environment surrounding the vehicle, or (3) sound caused by the vehicle. The at least one attribute of the environment surrounding the vehicle can refer to, for example, debris/dust/smoke produced near a tire of the vehicle, other vehicles near the vehicle that are honking, other vehicles previously near the vehicle that are moving away from the trailer, etc.

At 404, a determination is made by the processor if at least one tire from the plurality of tires is faulty based on the sensor data. The processor can use at least one software model (e.g., software model(s) 106) configured to detect faulty tires at the vehicle. A tire at the vehicle can be detected to be faulty by the software model if, for example, the steering wheel torque of the vehicle has increased, the acceleration of the vehicle has decreased, the yaw of the vehicle has increased, the roll of the vehicle has increased, the vehicle has a forward pitch, debris/dust/smoke is being produced near a tire of the vehicle, other vehicles near the vehicle are honking, other vehicles previously near the vehicle are moving away from the trailer, a predetermined sound pattern is detected (e.g., an abrupt sound indicating that a tire has blown out, a scraping sound of a wheel scraping the ground, repetition of a flapping sound indicating that a tire is flat), etc.

At 406, at least one side of the vehicle and at least one axle from the plurality of axles associated with the at least one tire is determined (or identified) by the processor in response the determining that the at least one tire is faulty. Said similarly, if 404 determines that at least one tire from the plurality of tires is faulty, at 406, a side(s) and axle(s) of the vehicle where each faulty tire is located is determined (or identified). The at least one side and at least one axle can be determined (or identified) using at least one software model (e.g., software model(s) 106) and sensor data received at 402.

At 408, at least one remedial action to be performed by the vehicle is determined by the processor based on the sensor data, the at least one side, and the at least one axle. Said similarly, the at least one remedial action to be performed can be determined while taking into consideration attributes of a surrounding of the vehicle and/or attributes of the vehicle itself, and a location(s) of the at least one tire determined to be faulty. For example, the at least one remedial action can cause the vehicle to perform an action that will cause minimum risk to other vehicles surrounding the vehicle, and that will minimize and/or not add additional weight to the at least one tire determined to be faulty.

At 410, a signal to cause the at least one remedial action to be performed by the vehicle is sent by the processor in response to the determining that the at least one tire is faulty. The signal could be sent, for example, from the processor to a motion control system (e.g., motion control system 110) so that the vehicle can perform a driving maneuver and/or to an alarm system (e.g., alarm system 108) so that a passenger, driver, nearby person, etc. is notified of the faulty tire and/or other actions that should and/or are recommended to take place.

FIG. 5 shows a flowchart of a method for detecting a faulty tire at a vehicle (e.g., vehicle 100), according to an embodiment. The method discussed with respect to FIG. 5 can be performed by a processor (e.g., processor 102) included at the vehicle.

At 502, sensor data collected by at least one sensor (e.g., sensor(s) 112) included in a vehicle (e.g., vehicle 100) is received. The sensor data can include, for example, a representation of at least one of (1) dynamics of the vehicle, (2) a surrounding of the vehicle, or (3) sound caused by the vehicle.

At 504, at least one of the dynamics, the surrounding, or the sound are analyzed (e.g., by software model(s) 106) for at least one predefined indictor indicating that at least one tire from a plurality of tires is faulty. The plurality of tires can be all tires included in the vehicle, or a portion of all tires included in the vehicle (e.g., only tires included at a trailer of the vehicle). The at least one predefined indicator could be, for example, a steering wheel torque associated with the vehicle increasing, an acceleration of the vehicle decreasing, a yaw of the vehicle increasing, a roll of the vehicle increasing, the vehicle having a forward pitch, debris/dust/smoke is being produced near a tire of the vehicle, other vehicles near the vehicle honking, other vehicles previously near the vehicle moving away from the trailer, detecting a predetermined sound pattern (e.g., an abrupt sound indicating that a tire has blown out, a scraping sound of a wheel scraping the ground, repetition of a flapping sound indicating that a tire is flat), or any combination thereof.

At 506, a determination is made if the at least one tire is faulty. If the at least one predefined indicator is found at 504, the method proceeds to 508. If the at least one predefined indicator is not found at 504, 506 proceeds to 502.

At 508, at least one side of the vehicle and at least one axle from the plurality of axles associated with the at least one tire is determined by the processor. Said similarly, if 506 determines that the at least one tire from the plurality of tires is faulty, at 508, a side(s) and axle(s) of the vehicle where each faulty tire is located is determined. The at least one side and at least one axle can be determined using at least one software model (e.g., software model(s) 106) and sensor data received at 502.

At 510, at least one remedial action to be performed by the vehicle is determined by the processor based on the sensor data, the at least one side, and/or the at least one axle. Said similarly, the at least one remedial action to be performed can be determined while taking into consideration attributes of a surrounding of the vehicle and/or attributes of the vehicle itself, and/or a location(s) of the at least one tire determined to be faulty. For example, the at least one remedial action can cause the vehicle to perform an action that will cause minimum risk (or reduced risk) to other vehicles surrounding the vehicle, and that will minimize and/or not add additional force, pressure, and/or momentum to the at least one tire determined to be faulty.

At 512, a signal to cause the at least one remedial action to be performed by the vehicle is sent by the processor in response to the determining that the at least one tire is faulty. The signal could be sent, for example, from the processor to a motion control system (e.g., motion control system 110) so that the vehicle can perform a driving maneuver and/or to an alarm system (e.g., alarm system 108) so that a passenger, driver, nearby person, etc. is notified of the faulty tire and/or other actions that should and/or are recommended to take place.

In some implementations, any of the methods discussed with respect to FIGS. 2-5 can further include estimating a set of weights placed at axles and/or left and right portions of axles included in the vehicle by the vehicle (including any loads the vehicle may be carrying) as the vehicle is driving. In some implementation, the set of weights are estimated for axles and/or left and right portions of axles included in a trailer (and not a truck). At least one of determining if a tire is faulty, determining a side and axle associated with a faulty tire, or determining a remedial action to be performed can be based on the estimated set of weights. In some implementations, estimating the set of weights is the at least one remedial action, and determining (e.g., by software model(s) 106) that the vehicle is (1) unbalanced and/or (2) a weight at an axle and/or left or right portion of an axle is above a predetermined threshold value can automatically cause another remedial action to be performed.

In some embodiments, a method comprises: receiving sensor data at a processor of a vehicle including at least one sensor, a plurality of axles, and a plurality of tires coupled to the plurality of axles, the sensor data including a representation of at least one of dynamics of the vehicle, a surrounding of the vehicle, or audio associated with the vehicle; determining, by the processor, if at least one tire from the plurality of tires is faulty based on the sensor data; determining, by the processor, at least one side of the vehicle and at least one axle from the plurality of axles associated with the at least one tire in response to the determining that the at least one tire is faulty; determining, by the processor, at least one remedial action to be performed by the vehicle based on the sensor data, the at least one side, and the at least one axle; and sending, by the processor, a signal to cause the at least one remedial action to be performed by the vehicle in response to the determining that the at least one tire is faulty.

In some implementations, the vehicle is a semi-truck.

Some implementations further comprise determining, by the processor, a set of weights associated with the plurality of axles in response to the determining that the at least one tire is faulty, the determining the at least one remedial action further based on the set of weights.

In some implementations, the determining if the at least one tire is faulty includes generating a confidence metric indicating a likelihood that the at least one tire is already faulty based on the sensor data, the at least one tire determined to be faulty if the confidence metric is within a predetermined range.

In some implementations, the vehicle further includes a steering column, and the sensor data indicates an acceleration of the vehicle, a roll of the vehicle, a pitch of the vehicle, a yaw of the vehicle, and a torque associated with the steering column.

In some implementations, the determining if the at least one tire is faulty includes analyzing the acceleration, the roll, the pitch, the yaw, and the torque for a predetermined relationship, the at least one tire is determined to be faulty if the at least one predetermined relationship is detected.

In some implementations, the vehicle is a first vehicle and the sensor data representing the surrounding of the first vehicle indicates at least one of: (1) behavior of at least one second vehicle near the first vehicle, or (2) attributes associated with debris caused by the first vehicle.

In some implementations, the at least one sensor includes a microphone, and at least one imaging sensor.

In some implementations, the at least one remedial action includes, by the processor, autonomously and automatically slowing down the vehicle and alerting a passenger of the vehicle that the at least one tire is faulty.

In some implementations, the vehicle is operating in a first mode during the receiving, and the at least one remedial action causes the vehicle to operate in a second mode different than the first mode.

In some implementations, the determining if the at least one tire from the plurality of tires is faulty includes analyzing the audio for a predetermined pattern, the at least one tire determined to be faulty if the predetermined pattern is detected.

In some implementations, the vehicle includes a truck and a trailer coupled to the truck, the at least one sensor is included in the truck, the plurality of tires are included in the trailer, and the trailer does not include sensors configured to measure attributes associated with the plurality of tires.

In some embodiments, a method comprises: receiving sensor data at a processor of a vehicle including at least one sensor, a steering column, a plurality of axles, and a plurality of tires coupled to the plurality of axles, the sensor data including a representation of at least one of: (1) at least one of an acceleration of the vehicle, a roll of the vehicle, a pitch of the vehicle, a yaw of the vehicle, or a torque associated with the steering column, (2) at least one attribute of an environment surrounding the vehicle, or (3) sound caused by the vehicle; determining, by the processor, if at least one tire from the plurality of tires is faulty based on the sensor data; determining, by the processor, at least one side of the vehicle and at least one axle from the plurality of axles associated with the at least one tire in response to the determining that the at least one tire is faulty; determining, by the processor, at least one remedial action to be performed by the vehicle based on the sensor data, the at least one side, and the at least one axle; and sending, by the processor, a signal to cause the at least one remedial action to be performed in response to the determining that the at least one tire is faulty.

In some implementations, the vehicle is an autonomous vehicle, and the at least one remedial action causes the vehicle to automatically pull over to a shoulder of a drivable area without requiring additional human input.

In some implementations, the vehicle is operating in a manual driving mode prior to the causing of the at least one remedial action to be performed, and the at least one remedial action inhibits the vehicle from operating in an autonomous driving mode.

In some implementations, the at least one remedial action is a first remedial action and the first remedial action includes estimating a set of weights associated with the plurality of axles, the method further comprising: causing a second remedial action to be performed in response to determining that the vehicle is unbalanced based on the set of weights.

In some embodiments, a system comprises: at least one sensor to collect sensor data, the sensor data including a representation of at least one of (1) dynamics of the system, (2) a surrounding of the system, or (3) sound caused by the system; and processing circuitry operatively coupled to the at least one sensor and configured to: receive the sensor data; analyze at least one of the dynamics, the surrounding, or the sound for at least one predefined indicator indicating that at least one tire from a plurality of tires is faulty; and in response to determining, using the sensor data, that the at least one tire is faulty, (1) determine at least one side of the system and at least one axle from a set of axles associated with the at least one tire, (2) determine at least one remedial action to be performed by the system based on the at least one side, the at least one axle, and the sensor data, and (3) send a signal to cause the at least one remedial action to be performed by the system.

In some implementations, the system includes a truck and a trailer coupled to the truck, the at least one of sensor is included in the truck, the plurality of tires are included in the trailer, and the trailer does not include sensors configured to measure attributes associated with the set of tires.

In some implementations, the system is operating in an autonomous driving mode prior to sending the signal to cause the at least one remedial action to be performed, and the at least one remedial action causes the system to operate in a manual driving mode.

In some implementations, the at least one remedial action is a first remedial action and the first remedial action includes estimating a set of weights associated with the plurality of axles, and the processing circuitry is further configured to: cause a second remedial action to be performed in response to determining that the system is unbalanced based on the set of weights.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A computer-implemented method, comprising:
receiving sensor data from a plurality of sensors of a first vehicle including the plurality of sensors, a steering column, a plurality of axles, and a plurality of tires coupled to the plurality of axles, the plurality of sensors including a microphone and at least one of a camera, a radar, and a lidar, the sensor data including (i) first sensor data including a representation of sound collected by the microphone and associated with the first vehicle and (ii) second sensor data including a representation of a surrounding of the first vehicle collected by the at least one of a camera, a radar, and a lidar, the second sensor data indicating at least one of:
(1) behavior of at least one second vehicle near the first vehicle, and
(2) attributes associated with debris caused by the first vehicle;
determining whether at least one tire from the plurality of tires is faulty based on the sensor data;
determining at least one side of the first vehicle and at least one axle from the plurality of axles associated with the at least one tire in response to the determining that the at least one tire is faulty;

determining at least one remedial action to be performed by the first vehicle based on the first sensor data, the second sensor data, the at least one side, and the at least one axle; and performing the at least one remedial action, wherein the first vehicle is operating in a manual driving mode prior to determining the at least one remedial action to be performed, and wherein the at least one remedial action inhibits the first vehicle from operating in an autonomous driving mode.

2. The computer-implemented method of claim 1, wherein the first vehicle is a semi-truck.

3. The computer-implemented method of claim 1, further comprising:

determining a set of weights associated with the plurality of axles in response to the determining that the at least one tire is faulty, the determining the at least one remedial action further based on the set of weights.

4. The computer-implemented method of claim 1, wherein the determining whether the at least one tire is faulty includes generating a confidence metric indicating a likelihood that the at least one tire is faulty based on the sensor data, the at least one tire determined to be faulty when the confidence metric is within a predetermined range.

5. The computer-implemented method of claim 1, wherein the first vehicle further includes a steering column, wherein the plurality of sensors includes at least one of an inertial measurement unit (IMU) or a gyroscope and the sensor data includes third sensor data collected by the at least one of an inertial measurement unit (IMU) or a gyroscope that indicates at least one of an acceleration of the first vehicle, a roll of the first vehicle, a pitch of the first vehicle, a yaw of the first vehicle, or a torque associated with the steering column.

6. The computer-implemented method of claim 5, wherein the determining whether the at least one tire is faulty includes analyzing the acceleration, the roll, the pitch, the yaw, and the torque for a predetermined relationship, and the at least one tire is determined to be faulty if the at least one predetermined relationship is detected.

7. The computer-implemented method of claim 1, wherein the plurality of sensors include at least one imaging sensor.

8. The computer-implemented method of claim 1, wherein the at least one remedial action includes automatically slowing down the first vehicle and alerting a passenger of the first vehicle that the at least one tire is faulty before inhibiting the first vehicle from operating in an autonomous driving mode.

9. The computer-implemented method of claim 1, wherein the determining whether the at least one tire from the plurality of tires is faulty includes analyzing the representation of sound for a predetermined pattern, the at least one tire determined to be faulty when the predetermined pattern is detected.

10. The computer-implemented method of claim 1, wherein the first vehicle includes a truck and a trailer coupled to the truck, the plurality of sensors are included in the truck, the plurality of tires are included in the trailer, and the trailer does not include sensors configured to measure attributes associated with the plurality of tires.

11. The computer-implemented method of claim 1, wherein the at least one remedial action causes the first vehicle to automatically pull over to a shoulder of a drivable area without requiring additional human input before inhibiting the first vehicle from operating in an autonomous driving mode.

12. A non-transitory, computer-readable storage medium including instructions that, when executed by at least one processor of a computing system, cause the system to perform operations comprising:

receiving sensor data from a plurality of sensors of a first vehicle including the plurality of sensors, a steering column, a plurality of axles, and a plurality of tires coupled to the plurality of axles, the plurality of sensors including a microphone and at least one of a camera, a radar, and a lidar, the sensor data including (i) first sensor data including a representation of sound collected by the microphone and associated with the first vehicle and (ii) second sensor data including a representation of a surrounding of the first vehicle collected by the at least one of a camera, a radar, and a lidar, the second sensor data indicating at least one of:

(1) behavior of at least one second vehicle near the first vehicle, and (2) attributes associated with debris caused by the first vehicle;

determining whether at least one tire from the plurality of tires is faulty based on the sensor data;

determining at least one side of the first vehicle and at least one axle from the plurality of axles associated with the at least one tire in response to the determining that the at least one tire is faulty;

determining a remedial action to be performed by the first vehicle based on the first sensor data, the second sensor data, the at least one side, and the at least one axle; and performing the at least one remedial action, wherein the first vehicle is operating in a manual driving mode prior to determining the at least one remedial action to be performed, and wherein the at least one remedial action inhibits the first vehicle from operating in an autonomous driving mode.

13. The non-transitory, computer-readable medium of claim 12, wherein the at least one remedial action causes the first vehicle to automatically pull over to a shoulder of a drivable area without requiring additional human input before inhibiting the first vehicle from operating in an autonomous driving mode.

14. The non-transitory, computer-readable medium of claim 12, wherein the at least one remedial action is a first remedial action and the first remedial action includes estimating a set of weights associated with the plurality of axles, the operations further comprising:

causing a second remedial action to be performed in response to determining that the first vehicle is unbalanced based on the set of weights, wherein the second remedial action includes at least one of displaying a warning or outputting an audio message.

15. The non-transitory, computer-readable medium of claim 12, wherein the at least one remedial action includes automatically slowing down the first vehicle and alerting a passenger of the first vehicle that the at least one tire is faulty before inhibiting the first vehicle from operating in an autonomous driving mode.

16. A system, comprising:

a plurality of sensors disposed on a first vehicle to collect sensor data, the plurality of sensors including a microphone and a camera at least one of a camera, a radar, and a lidar, the sensor data including (i) first sensor data including a representation of sound collected by the microphone and associated with the first vehicle and (ii) second sensor data including a representation of a surrounding of the first vehicle collected by the at least one of a camera, a radar, and a lidar, the second sensor data indicating at least one of:
(1) behavior of at least one second vehicle near the first vehicle, and
(2) attributes associated with debris caused by the first vehicle;

at least one processor; and a memory operably coupled to the at least one processor and storing instructions to cause the system to perform operations comprising:

receiving the sensor data;

determining, using the sensor data, that at least one tire of the first vehicle is faulty by analyzing the sound for at least one predefined indicator indicating that the at least one tire is faulty; and in response to determining, using the sensor data, that the at least one tire is faulty,
(1) determining at least one side of the first vehicle and at least one axle from a plurality of axles associated with the at least one tire,
(2) determining at least one remedial action to be performed by the system based on the at least one side, the at least one axle, the first sensor data, and the second sensor data, and
(3) performing the at least one remedial action, wherein the first vehicle is operating in a manual driving mode prior to determining the at least one remedial action to be performed, and wherein the at least one remedial action inhibits the first vehicle from operating in an autonomous driving mode.

17. The system of claim 16, wherein the first vehicle includes a truck and a trailer coupled to the truck, the plurality of tires are included in the trailer, and the trailer does not include sensors configured to measure attributes associated with the plurality of tires.

18. The system of claim 16, wherein the at least one remedial action is a first remedial action and the first remedial action includes estimating a set of weights associated with the plurality of axles, and the operations further comprise:

causing a second remedial action to be performed in response to determining that the first vehicle is unbalanced based on the set of weights, wherein the second remedial action includes at least one of displaying a warning or outputting an audio message.

19. The system of claim 16, wherein the at least one remedial action includes automatically slowing down the first vehicle and alerting a passenger of the first vehicle that the at least one tire is faulty before inhibiting the first vehicle from operating in an autonomous driving mode.

20. The system of claim 16, wherein the at least one remedial action causes the first vehicle to automatically pull over to a shoulder of a drivable area without requiring additional human input before inhibiting the first vehicle from operating in an autonomous driving mode.

* * * * *